Feb. 19, 1929.

A. H. SEEBECK 1,702,418

CHAIN LOCK

Filed April 14, 1928

August H. Seebeck
Inventor

By C.A.Snow&Co.
Attorneys

Patented Feb. 19, 1929.

1,702,418

UNITED STATES PATENT OFFICE.

AUGUST H. SEEBECK, OF REDWOOD FALLS, MINNESOTA.

CHAIN LOCK.

Application filed April 14, 1928. Serial No. 270,040.

This invention aims to provide a simple device for connecting chains, the article being of peculiar utility in holding antiskid devices on the tire of an automobile: although the article is by no means restricted to that use.

The invention aims to provide novel means whereby the locking bolt is mounted, controlled and operated, the bolt cooperating in a novel way with the body, to retain the chain.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1:
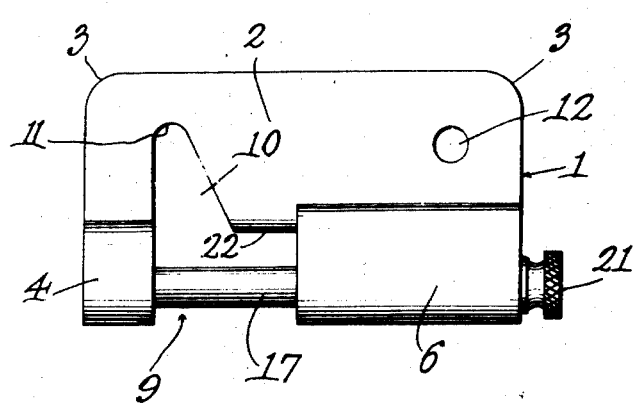
Figure 1 shows in elevation, a device constructed in accordance with the invention.
Figure 2:
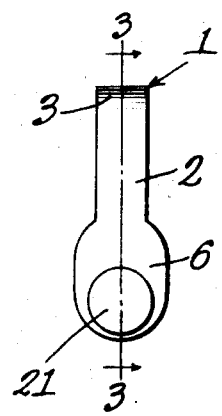
Figure 2 is an end elevation.

The device forming the subject matter of this application preferably is made of metal throughout, and includes a body 1 comprising a flange 2. The outer corners of the flange 2 are rounded off, as shown at 3. On the inner edge of the body 1, at one end of the body, there is a thickened keeper 4 having a bore 5. On the inner edge of the flange 1 there is a thickened guide 6 which has a bore 7. The guide 6 is longer than the keeper 4, the bore 7 of the guide 6 being aligned axially with the bore 5 of the keeper 4. At its outer end, the bore 7 is enlarged to form a seat 8. There is a recess 9 between the inner end of the keeper 5 and the inner end of the guide 6.

A V-shaped seat 10 is formed in the flange 2 and communicates with the recess 9. The inner edge of the flange 2 is rounded, on one side of the slot 10, as shown at 22. The slot 10 is provided with a rounded inner end 11 and one edge of the seat 10 is flush with the inner end surface of the keeper 4. In the flange 2 there is an opening 12, disposed near to one end of the flange 2.

Figure 3:
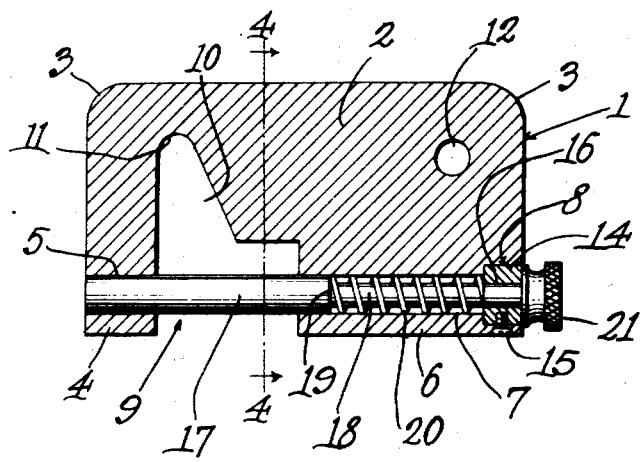
Figure 3 is a section on the line 3—3 of Figure 2.
Figure 4:
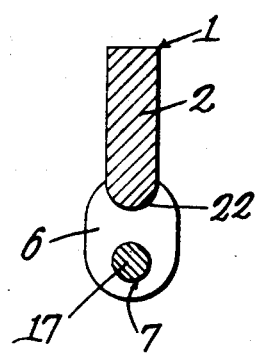
Figure 4 is a transverse section on the line 4—4 of Figure 3.

An annular bushing 14 is located in the seat 8 and is held in the seat by means of a securing element 15, such as a screw threaded into the guide 6 and into the bushing 14. The bushing 14 has an opening 16 which is coaxial with the bore 7, the opening 16 being of considerably less diameter than the bore 7. The numeral 17 designates a locking bolt which is mounted to slide in the bore 5 of the keeper 4 and in the bore 7 of the guide 6, the locking bolt 17 extending across the recess 9. The locking bolt 17 has a reduced stem 18 which is slidable in the bushing 14, the stem 18 forming a shoulder 19 in the locking bolt 17. A compression spring 20 is located in the bore 7, about the stem 18, one end of the spring abutting against the shoulder 19, and the other end of the spring abutting against the bushing 14. On the outer end of the stem 18, there is an enlarged head 21. The spring 20 advances the locking bolt 17 into the position shown in Figure 3, the locking bolt extending across the recess 9, so that a chain (not shown) which is engaged in the slot 10 cannot get free from the body 1. A chain (not shown) may, of course, be secured in the opening 12.

The bolt 17 is of such length that when the head 21 abuts against the bushing 14, the outer end of the bolt 17 is flush with the outer end surface of the keeper 4. The construction is such, therefore, that dirt cannot find its way into the bore 5. The head 21 is of greater diameter than the opening 16, and when the head 21 is in engagement with the bushing 14, dirt cannot find its way into the opening 16 of the bushing 14 wherein the stem 18 of the bolt 17 slides. The device is simple in construction but will be found to be highly effective as a connector and the construction is such that the article will withstand severe wear, the spring being housed in, as clearly shown in Figure 3 of the drawings.

What is claimed is:—

In a device of the class described, a body supplied at one end with a guide and at its opposite end with a keeper, there being a recess in the edge of the body between the guide and the keeper, the keeper having a bore which is extended entirely through the keeper, and the guide having a bore which is extended entirely through the guide, a bolt slidable in the bores and having a reduced stem defining a shoulder in the bolt, the stem and the shoulder being located in the bore of the guide, there being an enlargement at the outer end of the bore of the keeper, a bushing in the enlargement and having a reduced opening wherein the stem of the bolt slides, means for holding the bushing removably in the enlargement, a compression spring about the stem and engaged with the shoulder and with the bushing, and an enlarged head on the stem and engaging the bushing to limit the movement of the bolt under the action of the spring, the head extending beyond one end of the body and constituting means whereby the bolt may be retracted with respect to the spring.

In testimony that I claim the foregoing as my own, I have hereto affixed my signature.

AUGUST H. SEEBECK.